Figures 1, 2:
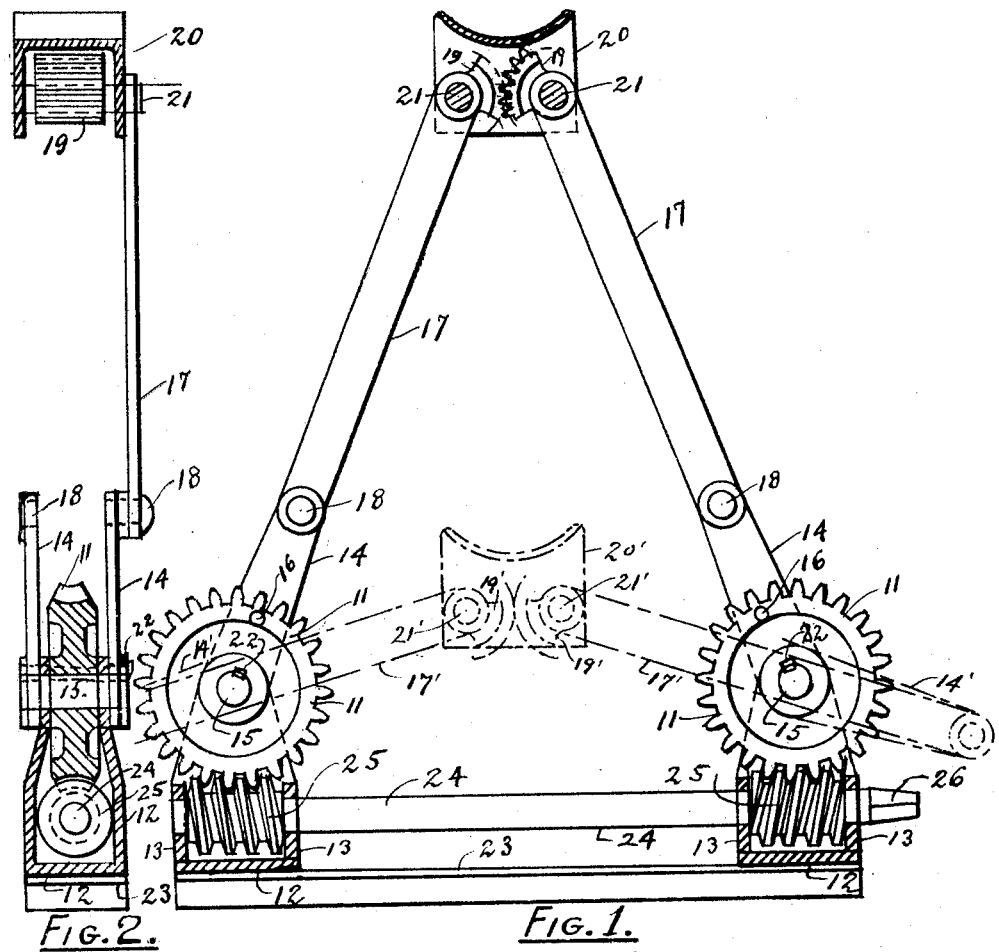

I. BENJAMINS.
HOISTING MECHANISM.
APPLICATION FILED JAN. 12, 1921.

1,399,736.

Patented Dec. 13, 1921.

Inventor
Israel Benjamins

UNITED STATES PATENT OFFICE.

ISRAEL BENJAMINS, OF BROOKLYN, NEW YORK.

HOISTING MECHANISM.

1,399,736.  Specification of Letters Patent.  Patented Dec. 13, 1921.

Application filed January 12, 1921. Serial No. 436,733.

*To all whom it may concern:*

Be it known that I, ISRAEL BENJAMINS, a citizen of the United States, residing at Brooklyn, in the county of Kings and State of New York, have invented a new and useful Hoisting Mechanism, of which the following is a specification.

My invention relates to improvements in hoisting mechanisms, which may be used for dental and barbers' chairs, as jacks for automobiles, carriages and wagons, also for scaffolds and for sundry other purposes, for which the construction of my hoisting mechanism is adapted, and it consists in the novel features hereinafter more fully described.

The objects of my improvement are:

First: To provide a collapsible hoisting mechanism with a stable base.

Second: To provide a saddle of constant length for the support of the load, said saddle being pivotally connected to the rods or bars supporting the same.

Third: To avoid long screws or bolts subject to bending; and

Fourth: To have my mechanism simple, durable and inexpensive. I attain these objects by the mechanism illustrated in the accompanying drawing or by any mechanical equivalent or obvious modification of the same.

In the drawings Figure 1 is a side view and Fig. 2 an end view partly broken off at the left end, both views being partly in cross-section and partly in elevation.

Similar numerals refer to similar parts throughout the several views as follows:

11, 11 designate a pair of worm gears, each supported by the bearings 12.

13, 13 are bearings for the support of the worm shaft 24 of the worms 25.

Said bearings 13, 13 may be connected to the bearings 12 by suitable fastenings which are not shown in the drawings.

The bearings 12 may be likewise connected to the base plate 23.

14 is a crank shown as connected to each of said worm gears 11 by means of the pins 15 and the keys 22, which fasten said pins to said worm gears and to each crank 14, which, if desired, may also be secured to said worm gears 11 by means of the pins 16, shown in Fig. 1 and omitted in Fig. 2.

17, 17 are two pairs of connecting rods pivotally connected at their lower ends to said cranks 14 and at their upper ends to the saddle 20 by means of the pins 18 and 21 respectively.

Each of said pins 21 has connected thereto a sector of a gear wheel 19, which sectors are in mesh with each other, thereby keeping the connecting rods 17, 17 at the same inclination with relation to a vertical or horizontal line passing through the center of each pin 21.

One of the sectors 19 is shown with its teeth, while the teeth of the other are omitted for the sake of clearness, and indicated by the pitch line of the teeth.

The shaft 24 terminates in the taper 26 which may be detachably connected to a key-wrench or lever for operating said worms 25, which may be secured to said shaft 24 or made in one therewith, if desired.

It is evident that by turning the worms 25, one of which is right handed and the other left handed, they will cause said worm gears 11 to rotate in opposite directions, thereby raising or lowering the saddle 20.

The lowest position of the saddle 20 is indicated in dot and dash lines in Fig. 1, also the corresponding positions of the cranks 14 and connecting rods 17.

As the worm gears rotate through less than 360 degrees to bring the saddle from the highest position to the lowest and vice versa, the teeth may be omitted on part of the periphery of each worm gear, if desired, and suitable stops provided thereon to make the worms operate the gears through the longest arcs when raising the same, thereby reducing the resistance to a minimum; thus: the gear on the right of Fig. 1 should be turned in a clockwise direction for raising the load and in a counter clockwise direction for lowering the same.

Instead of the worm gears a pair of plain spur gears may be used, and the latter may be made to mesh with each other, when one of the worms may be used and placed preferably at an angle to the plane of the gear in accordance with the rules of kinematics; also the upper ends of the connecting rods 17, instead of being directly connected to the saddle 20, may be connected instead to the lower ends of a pantograph, the upper ends of which may support the saddle 20, in which case the connecting rods 20 would cross each other and be pivotally connected to each other at the crossing point.

The upper bars of said pantograph may be open, (*i. e.* not crossed) at their upper ends, and their inclination to a vertical or horizontal line kept equal by means of the pair of sectors 19 as shown.

The sectors 19 are shown in Fig. 2 as inclosed by the saddle 20; but they may also be placed at one side thereof, if desired, thereby reducing the height of the saddle.

The worms 25 may be placed in contact with the upper part of the gears 11, if desired, thereby permitting the connection of the ends of the two cranks of each gear by a single through pin 18 instead of the two studs, as shown in Fig. 2.

Many other changes could be made in the details of my hoisting mechanism without departing from the main scope of my invention. I do not, therefore, restrict myself to the details as shown; but I intend to include also all mechanical equivalents and obvious modifications of the same within the scope of my invention.

What I claim as my invention, and desire to secure by Letters Patent is:

1. In a hoisting mechanism a pair of gears, a pair of worms in mesh therewith and adapted to rotate said gears in opposite directions, a crank connected to each of said gears and adapted to rotate therewith, a connecting rod pivotally connected at its lower end to each of said cranks and a support for a load at the upper ends of said connecting rods.

2. In a hoisting mechanism a pair of gears, a means for rotating said gears in opposite directions, a pair of connecting rods, pivotally connected at their lower ends to said gears and at their upper ends to a means for supporting a load, and a means for keeping the angle of inclination of said connecting rods equal to each other.

3. In a hoisting mechanism a pair of gears, a means for rotating said gears in opposite directions, a pair of connecting rods, pivotally connected at their lower ends to said gears and terminating at their upper ends in a pantograph, and a means for supporting a load at the upper end thereof.

4. In a hoisting mechanism a gear, a worm in mesh therewith and adapted to rotate said gear and a connecting rod pivotally connected at its lower end to said gear and at its upper end to a support for a load, combined with a means for coöperating with said gear, said worm and said connecting rod to support the load in any position and to raise and lower said load.

5. In a hoisting mechanism a rotary member, a means for rotating the same and a connecting rod pivotally connected at its lower end to said member and at its upper end to a support for a load, combined with a means for coöperating with said member, said rotating means and said connecting rod to support the load in any position and to raise and lower said load.

ISRAEL BENJAMINS.